H. L. BOCK.
ROLLER BEARING.
APPLICATION FILED JUNE 28, 1913.

1,200,456.

Patented Oct. 10, 1916.

Witnesses
N. K. Ford
James P. Berry

Inventor
Henry L. Bock
By Whittemore Hulbert & Whittemore
Atty's

UNITED STATES PATENT OFFICE.

HENRY L. BOCK, OF TOLEDO, OHIO, ASSIGNOR, BY MESNE ASSIGNMENTS, TO THE BOCK COMPANY, A CORPORATION OF OHIO, (INCORPORATED IN OHIO IN MARCH, 1916.)

ROLLER-BEARING.

1,200,456.     Specification of Letters Patent.     Patented Oct. 10, 1916.

Application filed June 28, 1913. Serial No. 776,273.

*To all whom it may concern:*

Be it known that I, HENRY L. BOCK, a citizen of the United States of America, residing at Toledo, in the county of Lucas and State of Ohio, have invented certain new and useful Improvements in Roller-Bearings, of which the following is a specification, reference being had therein to the accompanying drawings.

The invention relates to roller bearings of the type in which radial loads are carried by cylindrical rollers and end thrust by enlargements of said rollers forming contacting faces in alinement with the cylindrical faces.

Various constructions have been heretofore devised in which enlargements have been formed integral with the cylindrical portions of the rollers. With the present invention I have simplified the construction by employing balls for the enlargements formed separable from the cylindrical rollers but arranged and retained in alinement therewith.

Figure 4:
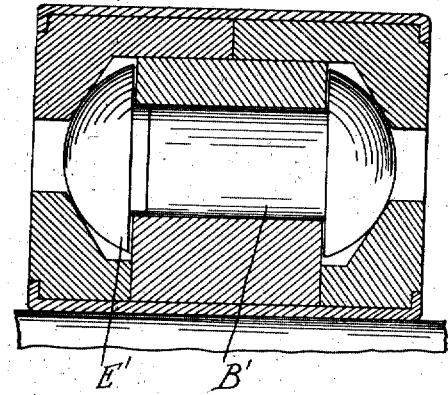
Figure 5:
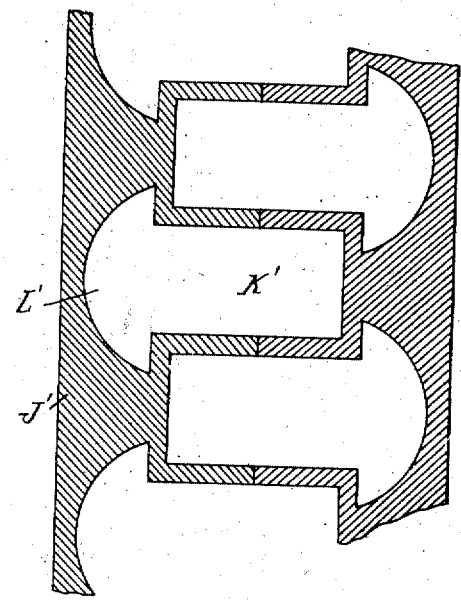
Figure 3:
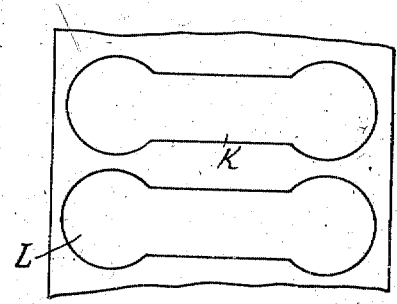
Figure 2:
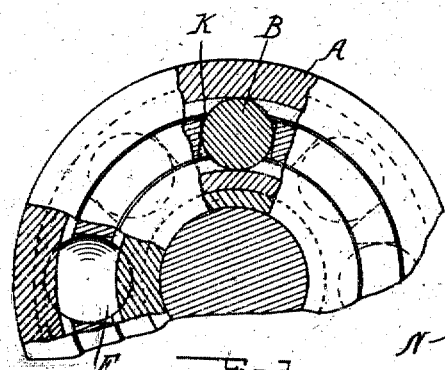
Figure 1:
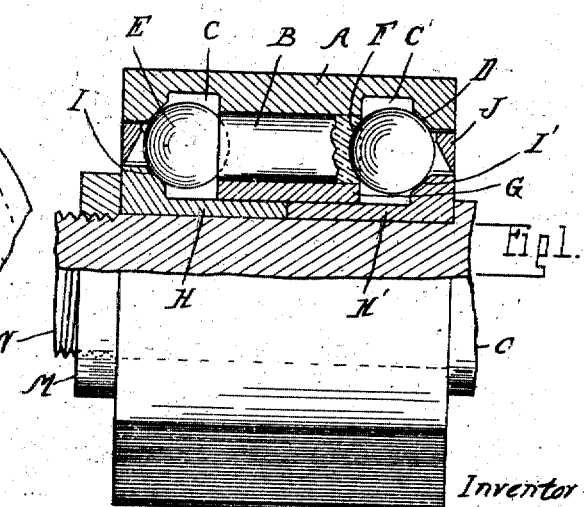

In the drawings: Figure 1 is a longitudinal section through a bearing constructed in accordance with my invention; Fig. 2 is a cross section showing the construction of the cage or retainer; Fig. 3 is a side elevation thereof; and Figs. 4 and 5 are sections showing a modified construction.

A is a race member for engaging a series of cylindrical rollers B.

C and C' are grooves formed in said race member at opposite ends of the rollers B and providing bevel faces D forming end thrust bearings.

E are balls of greater diameter than the rollers B and arranged in axial alinement therewith, being held from displacement by engagement with recesses F in the ends of the rollers. The balls E are adapted to bear against the end thrust bevel faces D at a point in alinement with the cylindrical faces of the rollers, and therefore the rollers and balls will travel around the race member at the same speed, and without any differential speed with the contacting faces of the race member.

Upon the opposite side of the rollers and balls is a race member formed of separable sections, so as to permit assembly of the parts. This, as shown, comprises a cylindrical member G for contacting with the cylindrical rollers and separable members H and H' sleeved within the member G and providing opposed bevel faces I and I' for contacting with the balls E.

J is a cage or spacer, which is in the form of a ring interposed between the inner and outer race members and provided with slots K therein for receiving the cylindrical rollers, with enlargements L at their opposite ends for receiving the balls.

In assembling the parts, the cage J may be placed adjacent to the race member A, and the rollers B and balls E dropped into the slots K and L therearound. Before placing the balls at one end in engagement with the slots, the member G is placed in position, and after said balls are engaged the members H and H' are sleeved upon the member G from opposite sides of the bearing. The members H H' and G are thus held from disengagement by suitable clamping means—such as a nut M upon a shaft N upon which said members are sleeved, and which will clamp said members against a collar O on the shaft.

In the modified construction shown in Figs. 4 and 5, in place of using separate balls, the rollers B' are formed with enlarged spherical heads E' integral therewith, but are held in properly spaced relation by a similar engagement with a cage member J'. This cage member is formed with slots K' and enlargements L' to receive said rollers and preferably with the enlargements alternately upon opposite sides of the cage, as shown. The parts may be assembled in a similar manner to that already described, and when in position the bearing will carry both radial and end thrust loads.

What I claim as my invention is:

1. A roller bearing, comprising a series of cylindrical rollers for receiving radial thrust, balls for receiving end thrust arranged at opposite ends of said rollers in axial alinement therewith, and race members for transmitting radial and end thrust engaging said rollers, and balls at points equidistant from the axis of rotation so as to maintain the same speed ratio.

2. A roller bearing, comprising a series of cylindrical rollers for concaved ends adapted to receive radial thrust, a series of balls respectively in alinement with said rollers and engaging the concaved ends thereof to receive end thrust and coöperating race members adapted to transmit radial and end thrust having contacting surfaces for said rollers and balls at equal distances from the axis thereof and from the axis of rotation to maintain the same peripheral speed.

3. A roller bearing, comprising a series of cylindrical rollers having concave ends, balls at opposite ends of each roller arranged in axial alinement therewith, and coöperating race members having cylindrical bearing portions and beveled end thrust portions having their bearing surfaces arranged in alinement with each other, the beveled end thrust portions having centrally located portions for contacting with the balls.

4. A roller bearing, comprising concentric race members, a series of rollers intermediate the same, enlargements at the ends of said rollers in axial alinement therewith, and an annular cage member interposed between said race members for substantially the entire length thereof, being spaced therefrom and provided with slots for the passage of said rollers and said enlargements therethrough.

5. A roller bearing, comprising concentric race members, a series of rollers therebetween, a series of balls arranged in axial alinement with said rollers and engaging grooves in said race members, and an annular cage interposed between said race members and extending for substantially the entire length thereof, having slots for receiving said rollers and enlargements for receiving said balls.

6. A roller bearing, comprising a series of cylindrical rollers for receiving radial thrust, balls for receiving end thrust arranged at opposite ends of said rollers in axial alinement therewith, and race members for engaging said rollers and balls at points equidistant from the axis of rotation so as to maintain the same speed ratio, the portion of the race members for engaging the balls adapted to transmit end thrust and having contacting surfaces extending symmetrically upon opposite sides of the points of contact.

In testimony whereof I affix my signature in presence of two witnesses.

HENRY L. BOCK.

Witnesses:
JAMES P. BARRY,
PHYLLIS COBURN.

Correction in Letters Patent No. 1,200,456.

It is hereby certified that the assignee in Letters Patent No. 1,200,456, granted October 10, 1916, upon the application of Henry L. Bock, of Toledo, Ohio, for an improvement in "Roller-Bearings," was erroneously described and specified as "The Bock Company," whereas said assignee should have been described and specified as *The Bock Bearing Company*, as shown by the records of assignments in this office; and that the said Letters Patent should be read with this correction therein that the same may conform to the record of the case in the Patent Office.

Signed and sealed this 22d day of October, A. D., 1918.

[SEAL.]

R. F. WHITEHEAD,
*Acting Commissioner of Patents.*

Cl. 64—62.